Figure 1:
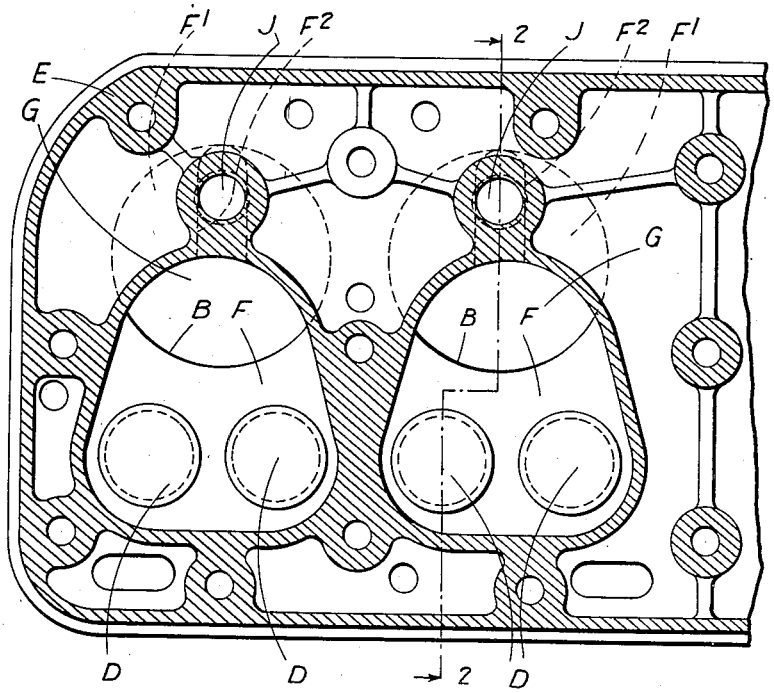

Dec. 10, 1929.   H. R. RICARDO   1,739,180

CYLINDER OF INTERNAL COMBUSTION ENGINES

Filed Sept. 17, 1928

INVENTOR
Harry R. Ricardo
By
Watson, Coit, Morse & Grindle
Attys

Patented Dec. 10, 1929

1,739,180

UNITED STATES PATENT OFFICE

HARRY RALPH RICARDO, OF LONDON, ENGLAND

CYLINDER OF INTERNAL-COMBUSTION ENGINES

Application filed September 17, 1928, Serial No. 306,527, and in Great Britain October 18, 1927.

The present invention relates to cylinders of internal combustion engines and more particularly to the formation of the combustion space in poppet valve internal combustion engines of the class which operate upon the constant volume cycle wherein the air and fuel are mixed intimately previous to compression and the combustion process. The invention relates more particularly to that type of engine of the above class known as side valve engines in which the valves are located at the side of the engine cylinder as distinguished from overhead valve engines.

The object of the present invention is to provide an improved form of combustion chamber for engines of the type indicated which, while promoting a high thermal efficiency and a reduced tendency to detonation, will result in a smooth running engine free from roughness.

It is essential that some degree of turbulence of the charge or a substantial portion of the charge shall exist at the moment of ignition, that is to say that the gases forming the combustible charge shall be in a state of motion as opposed to a stagnant state in which motion is either entirely absent or is of such a small order that inflammation can spread by contact from particle to particle at a rate substantially as great as that at which the particles are moving. Turbulence may exist in several forms of which the principal appear to be as follows:—

(1) "General" turbulence in which particles are moving in all directions.

(2) "Organized" turbulence in which substantially the whole body of the charge is involved in a unidirectional state of motion.

(3) "Eddying" turbulence in which a portion or several portions of the charge are in a state of independent unidirectional motion.

Turbulence of the major portion of the charge may exist from any one of the following causes or from a combination of any or all of them:— a. The high entering velocity of the gases through the inlet orifice.

b. Mechanical disturbance of the charge within the combustion space produced during the compression stroke by forcing the charge from the cylinder into the combustion space through a port or other restricted part or passage as, for example, by the means described and claimed in the specification of the present inventor's Letters Patent of the United States of America No. 1,474,003.

c. Mechanical disturbance produced as wellknown by allowing the piston top to approach closely a part of the head of the cylinder so as to displace violently the portion of the charge trapped between the piston and the cylinder head.

d. Thermal disturbance produced by arranging the charge in two parts in such a manner that one part being ignited, a disturbance of the other part results from the expansion of the first inflamed part.

It has been found that organized turbulence is an undesirable feature in a homogeneous charge engine owing to the fact that when the ignition spark passes the nucleus of flame created in the body of the charge is carried round at the same rate as the rotating body of gas so that spread of inflammation depends almost entirely upon contact between inflamed and uninflamed particles. This results in a slow spread of the flame as distinct from the rapid general dissemination of inflammation which occurs when "general" turbulence exists. Hence it is desirable to avoid organized rotational turbulence and experiment has shown that of the three forms of turbulence set out above that described as "general" is of the greatest practical use for engines operating on the constant volume cycle.

In the specification of the present inventor's prior Letters Patent of the United States of America No. 1,474,003 mentioned above, turbulence of the "general" type is produced mechanically during the compression stroke the charge in that case being ignited by an igniting device located in the main and laterally disposed part of the combustion space which is in communication by way of a port with the end of the cylinder. By reason of the close approach of the face of the piston to the end of the cylinder at the end of the compression stroke the main portion of the charge is forced through this port into the main combustion space It has been found that under certain conditions in such an engine with the igniting device disposed in the main part of the combustion chamber in which the whole of the charge is in a state of high "general" turbulence, the resulting pressure rise causes "spring" of such parts of the engine as the connecting rod, crankshaft etc. and this gives rise to an indeterminate drumming noise accompanied by a high periodicity vibration, a condition generally known as rough running. By the present improvements the rough running in such an engine is obviated while maintaining a high degree of general turbulence.

According to this invention in a side valve engine of the type indicated the igniting device is located in a part of the cylinder head which lies opposite to the cylinder bore and to which the face of the piston approaches closely while the main part of the combustion space is disposed laterally with a port between it and the end of the cylinder so that the ignition of the charge is initiated in that small part thereof which lies between the end of the cylinder and the face of the piston at the end of the compression stroke this part of the charge burning less rapidly than the main portion of the charge will burn when the flame spreads thereto by reason of this first ignited part of the charge being then in a stagnant or nonturbulent state, the inflammation being transmitted to the main body of the charge over the whole width of the port through which that part of the charge has been forced by the close approach of the piston face to the cylinder head. By this means the desired "general" turbulence can be obtained together with smooth running and it is possible to employ without roughness of running a degree of turbulence of the main portion of the charge which will give a rate of pressure rise of the order of 60 pounds per square inch per degree of crank angle.

It is to be understood that the rate of pressure rise which may be employed without causing rough running is dependent amongst other things upon the stiffness of the engine structure. The elimination of roughness by means of the present invention is due to the slow pressure rise of the first ignited portion of the charge the expansion of which takes up the "spring" of the engine parts. In the particular construction of engine to which this invention relates, the expansion of this first ignited portion of the charge is not of itself intended to be the main cause of the turbulence of the remainder of the charge in the main part of the combustion chamber although obviously this expansion will contribute to this turbulence. On the other hand, the "general" turbulence is due to causes $a$, $b$ and $c$ above and is caused primarily by mechanical means, that is to say the close approach of the face of the piston to the end of the cylinder and the resultant forcing of the main part of the charge from the cylinder through the port into the laterally disposed combustion chamber.

Figure 2:
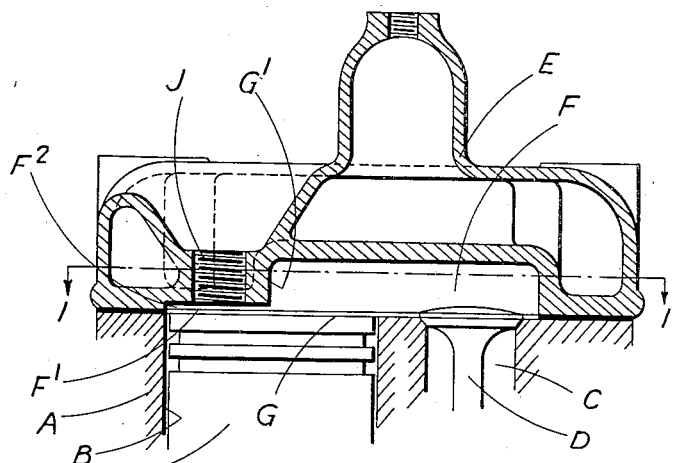

The invention may be carried into practice in various ways but one cylinder head construction according to this invention is illustrated by way of example in the accompanying drawings, in which Figure 1 is a sectional plan through the combustion chamber on the line 1—1 of Figure 2, and Figure 2 is a section on the line 2—2 of Figure 1.

In the construction illustrated the engine comprises a cylinder block A in which are formed cylinder bores B and inlet and exhaust passages C controlled by valves D. Mounted on the cylinder block A is a cylinder head member E so constructed as to form with the cylinder block a series of combustion chambers. Each of these combustion chambers comprises a main part F which contains the valves D and overlaps the cylinder bore B so as to communicate therewith through a port G, and a subsidiary part $F^1$ which lies opposite to the cylinder bore and is of small dimension measured in the direction of the cylinder axis when the piston is at the end of its compression stroke owing to the close approach of the piston to the portion of the cylinder head bounding this part $F^1$ of the combustion chamber. A screwthreaded bore J for a sparking plug is provided in the part of the cylinder head bounding the portion $F^1$ of each combustion chamber so that the ignition of the charge is initiated in this part.

It is preferable that the amount of combustible charge comprised in that portion thereof which is first ignited, that is to say, the part which at the end of the compression stroke lies in a comparatively stagnant state in the portion $F^1$ of the combustion chamber between the face of the piston and the cylinder head should not exceed approximately 10% of the whole charge. The weaker is the engine structure, the nearer should the quantity of the first ignited portion of the charge approach this proportion of the whole charge, while on the other hand with a stiffer engine structure it is possible, as for instance by reducing the clearance space between the face of the piston and the portion of the cylinder head to which it approaches closely, to reduce the amount of the relatively stagnant part of the charge which lies in the portion of the combustion chamber between these parts and is first ignited. It is desirable that the depth of this portion of the combustion chamber at the end of the compression stroke measured normal to the surface of the piston face should not exceed 4% of the piston stroke.

In those cases where owing to conditions of weakness in the engine structure it is necessary or desirable to increase up to the limit indicated the proportion of the first ignited part of the charge in order to take up "spring" of the parts, it may be necessary to reduce the degree of mechanically produced turbulence of the main charge which arises from the passage of this charge through the port connecting the cylinder bore and combustion chamber. This may be effected for example by modifying in a suitable manner the formation of the port or communicating part between the cylinder bore and the combustion chamber.

It is desirable that the boundary of the part of the combustion chamber containing the first ignited portion of the charge which lies towards the valves and is formed in the cylinder head, should be constituted by an abrupt edge as indicated at $G^1$ in the accompanying drawings in order to break up the flame advancing over this boundary and thus ensure the rapid dissemination of this flame throughout the whole mass of the main part of the charge contained in the lateral combustion space F.

Where as may be in some cases, the depth of the part $F^1$ of the combustion chamber is so reduced that it approaches the minimum of .020 inches, it is sometimes desirable to provide either a small recess around or adjacent to the igniting device, such recess being formed either in the cylinder head or in the face of the piston opposite to the igniting device. Such a recess is indicated at $F^2$ in the accompanying drawings and in the construction shown is in the form of a groove in the cylinder head extending from the portion thereof most remote from the main part F of the combustion chamber to the adjacent edge of this part. Alternatively, there may be employed an igniting device such as a sparking plug which has within itself an appreciable gas capacity. The object of this is to provide a nucleus of burning material of sufficient mass to project flame into the interspace between the piston and cylinder head with sufficient vigour to offset the chilling effect of the closely approaching surfaces of the piston and cylinder head which bound this interspace and are in contact with the first ignited part of the charge.

It has been found by experiment that if there is provided in the vicinity of the mouth of the sparking plug a capacity of not less than one cubic centimetre, then the depth of the interspace measured in the direction of the cylinder axis may be reduced to .022 of an inch in a cylinder of four inches bore and having a compression ratio of 5:1 and it will be possible to obtain good and consecutive firing under all conditions of load and with mixture strengths down to 20% weaker than complete combustion mixture.

In certain cases as for example in T-headed engines the main combustion space may be formed of two portions laterally disposed and the portion of the head to which the piston top closely approaches and in which the igniting device is located may be disposed between the two portions of the main combustion chamber.

The details of construction may be varied as found desirable as for instance with the object of adapting the features of the invention to any particular structure of engine of the type indicated in the specification of the present inventor's prior Letters Patent of the United States of America No. 1,474,003 to which the present improvement may be applied.

What I claim as my invention and desire to secure by Letters Patent is:—

1. An internal combustion engine operating on the constant volume cycle including in combination a cylinder, a combustion chamber overlapping the cylinder bore and having inlet and exhaust ports formed in a part thereof lying to the side of the cylinder bore, valves controlling these ports, a piston reciprocating within the cylinder so as to approach the part of the cylinder head lying over the cylinder bore closely at the end of the compression stroke and thus force the major portion of the charge through the port leading from the cylinder bore into the combustion chamber so as to cause turbulence of a general character therein, and means for igniting first the small portion of the charge remaining in the pocket-like part of the combustion chamber which lies between the piston face and the part of the cylinder head to which it closely approaches at the end of the compression stroke and which is in open communication with the main part of the combustion chamber overlapping the cylinder bore and containing the inlet and exhaust ports.

2. An internal combustion engine operating on the constant volume cycle, including in combination a cylinder, a combustion chamber overlapping the cylinder bore and having inlet and exhaust ports formed in a part thereof lying to the side of the cylinder bore, valves controlling these ports, a piston reciprocating within the cylinder so as to approach closely a part of the cylinder head lying over the cylinder bore at the end of the compression stroke and thus force the major portion of the charge through the port leading from the cylinder bore into the combustion chamber while leaving a portion of the charge not exceeding 10% of the whole charge in the pocket-like part of the combustion chamber which lies between the piston face and a part of the cylinder head to which it closely approaches at the end of the compression stroke and means for igniting first the small portion of the charge remaining in the pocket-like part of the combustion chamber at the end of the compression stroke which is in open communication with the main part of the combustion chamber overlapping the cylinder bore and containing the inlet and exhaust ports.

3. An internal combustion engine operating on the constant volume cycle including in combination a cylinder, a combustion chamber overlapping the cylinder bore and having inlet and exhaust ports formed in a part thereof lying to the side of the cylinder bore, valves controlling these ports, a piston reciprocating within the cylinder so as to approach closely a part of the cylinder head lying over the cylinder bore at the end of the compression stroke and thus force the major portion of the charge through the port leading from the cylinder bore into the combustion chamber so as to cause turbulence of a general character therein, means for igniting first a small portion of the charge remaining in the pocket-like part of the combustion chamber which lies between the piston face and the part of the cylinder head to which it closely approaches at the end of the compression stroke and a recess of small capacity adjacent to the ignition device for the purpose set forth.

4. An internal combustion engine operating on the constant volume cycle, including in combination a cylinder, a combustion chamber overlapping the cylinder bore and having inlet and exhaust ports formed in a part thereof lying to the side of the cylinder bore, valves controlling these ports, a piston reciprocating within the cylinder so as to approach closely a part of the cylinder head lying over the cylinder bore at the end of the compression stroke while leaving a portion of the charge not exceeding 10% of the whole charge in the pocket-like part of the combustion chamber which lies between the piston face and the part of the cylinder head to which it closely approaches at the end of the compression stroke, means for igniting first the small portion of the charge remaining in the pocket-like part of the combustion chamber which lies between the piston face and the part of the cylinder head to which it closely approaches at the end of the compression stroke and a small recess adjacent to the ignition device for the purpose set forth.

5. An internal combustion engine operating on the constant volume cycle, including in combination a cylinder, a combustion chamber overlapping the cylinder bore and having inlet and exhaust ports formed in a part thereof lying to the side of the cylinder bore, valves controlling these ports, a piston reciprocating within the cylinder so as to approach the part of the cylinder head lying over the cylinder bore closely at the end of the compression stroke and thus force the major portion of the charge through the port leading from the cylinder bore into the combustion chamber so as to cause turbulence of a general character therein, while leaving a small relatively stagnant part of the charge in the pocket-like part of the combustion chamber which lies between the piston face and the part of the cylinder head to which it closely approaches at the end of the compression stroke, this pocket-like part of the combustion chamber opening abruptly into the main part of the combustion chamber, and means for igniting first the small portion of the charge remaining in the pocket-like part of the combustion chamber which is in open communication with the main part of the combustion chamber overlapping the cylinder bore and containing the inlet and exhaust ports.

6. An internal combustion engine operating on the constant volume cycle, including in combination a cylinder, a combustion chamber overlapping the cylinder bore and having inlet and exhaust ports formed in a part thereof lying to the side of the cylinder bore, valves controlling these ports, a piston reciprocating within the cylinder so as to approach closely a part of the cylinder head lying over the cylinder bore at the end of the compression stroke and thus force the major portion of the charge through the port leading from the cylinder bore into the combustion chamber while leaving a portion of the charge not exceeding 10% of the whole charge in the pocket-like part of the combustion chamber which lies between the piston face and a part of the cylinder head to which it closely approaches at the end of the compression stroke, this pocket-like part of the combustion chamber opening abruptly into the main part of the combustion chamber, and means for igniting first the small portion of the charge remaining in the pocket-like part of the combustion chamber at the end of the compression stroke which is in open communication with the main part of the combustion chamber overlapping the cylinder bore and containing the inlet and exhaust ports.

7. In an internal combustion engine the combination of a cylinder with valve-controlled inlet and exhaust ports situated at the side thereof, a cylinder head, a combustion chamber formed in the cylinder head so as to lie over the valve-controlled ports with a part of it overlapping the cylinder bore with which the combustion chamber is then in open communication through a port, a piston within the cylinder, means for operating the piston so that at the end of the compression stroke it approaches the cylinder head closely so as to force the major portion of the charge into the combustion chamber, and an ignition device situated in the part of the cylinder head to which the piston closely approaches whereby the part of the charge in this part of the combustion space which is first ignited burns less rapidly than the main portion of the charge will burn when the flame spreads thereto by reason of the first ignited part being then in a stagnant or non-turbulent state, the inflammation being transmitted over the whole width of the port leading to the main part of the combustion space to the main body of the charge which is then in a state of general turbulence.

In testimony whereof I have signed my name to this specification.

HARRY RALPH RICARDO.